United States Patent [19]

Weinert

[11] Patent Number: 5,067,140
[45] Date of Patent: Nov. 19, 1991

[54] CONVERSION OF ANALOG SIGNAL INTO I AND Q DIGITAL SIGNALS WITH ENHANCED IMAGE REJECTION

[75] Inventor: Fritz K. Weinert, San Diego, Calif.

[73] Assignee: Titan Linkabit Corporation, San Diego, Calif.

[21] Appl. No.: 395,011

[22] Filed: Aug. 16, 1989

[51] Int. Cl.$^5$ .......................................... H04L 27/38
[52] U.S. Cl. ..................................... 375/77; 329/304; 375/82; 375/94
[58] Field of Search ................ 375/39, 77, 80, 82, 375/83, 84, 94; 329/304, 310, 311, 320

[56] References Cited

U.S. PATENT DOCUMENTS

| | | | |
|---|---|---|---|
| 3,699,321 | 10/1972 | Gibson | 375/15 |
| 3,727,136 | 4/1973 | Schroeder et al. | 375/15 |
| 3,947,768 | 3/1976 | Desblache et al. | 375/15 |
| 4,011,438 | 3/1977 | Aufderheide et al. | 364/724.11 |
| 4,253,186 | 2/1981 | Godard | 375/77 |
| 4,262,360 | 4/1981 | Bigo et al. | 375/77 |
| 4,570,126 | 2/1986 | Demmer et al. | 375/82 |
| 4,594,725 | 6/1986 | Desperben et al. | 375/15 |
| 4,709,374 | 11/1987 | Farrow | 375/13 |
| 4,759,037 | 7/1988 | Debus, Jr. et al. | 375/15 |
| 4,759,039 | 7/1988 | Debus, Jr. et al. | 375/39 |
| 4,910,469 | 3/1990 | Takahashi | 375/82 |

OTHER PUBLICATIONS

Brown, "First-Order Sampling of Bandpass Signals-A New Approach", IEEE Transactions on Information Theory, vol. IT-26, No. 5, Sep. 1980, pp. 613-615.
Rice and Wu, "Quadrature Sampling with Dynamic Range", IEEE Transactions on Aerospace and Electronic Systems, vol. AES-18, No. 4, Nov. 1982, pp. 736-739.
Roder, "A Simple Method for Sampling In-Phase and Quadrature Components", IEEE Transactions on Aerospace and Electronic Systems, vol. AES-20, No. 6, Nov. 1984, pp. 821-824.
Webb, "IF Signal Sampling Improves Receiver Detection Accuracy", Microwaves & RF, Mar. 1989, pp. 99-103.

Primary Examiner—Benedict V. Safourek
Attorney, Agent, or Firm—Edward W. Callan

[57] ABSTRACT

A system utilizing bandpass sampling for converting an analog input signal $A \cdot \sin((\omega_o + \omega_s)t + \phi)$ into (I) in-phase and a (Q) quadrature-phase digital signals for digital signal processing, in which image rejection is enhanced. $\omega_s$ is the baseband frequency, $\omega_o$ is the IF center frequency, and $\phi$ is the phase of the analog input signal. A sequence of digital signal samples obtained by bandpass sampling is processed to derive either the I digital signal or the Q digital signal as a first digital output signal from a first series of alternate samples and to derive the other of the I and Q digital signals as a second digital output signal by computing the average of the absolute values of alternate samples that immediately precede and follow the samples of the first series. In accordance with this processing scheme, there is no phase error, but instead an amplitude error in each I/Q pair equal to the value of $\cos \omega_s \tau$; and the image rejection becomes:

$$IR = 10 \log \frac{(1 + \cos\omega_s\tau)^2}{(1 - \cos\omega_s\tau)^2} = 20 \log \frac{(1 + \cos\omega_s\tau)}{(1 - \cos\omega_s\tau)} =$$

$$-40 \log \tan\left(\frac{\omega_s\tau}{2}\right) [dB]$$

For an UHF receiver with 25 KHz wide channels, the maximum baseband frequency is 12.5 KHz. When sampled at f=4 MHz, the image rejection is 80 dB.

3 Claims, 2 Drawing Sheets

CONVERSION OF ANALOG SIGNAL INTO I AND Q DIGITAL SIGNALS WITH ENHANCED IMAGE REJECTION

BACKGROUND OF THE INVENTION

The present invention generally pertains to electronic communications and is particularly directed to improving image rejection in a system for converting an analog signal into (I) in-phase and a (Q) quadrature-phase digital signals for digital signal processing.

A common prior art method of converting a received analog signal for digital processing is to split the received analog signal into an in-phase (I) component and a quadrature-phase (Q) component and to separately convert these two components into digital signals. A typical prior art system for accomplishing such conversion is described with reference to FIG. 1. This prior art system includes a first mixer 10, a second mixer 12, a phase shifter 14, a frequency generator 16, a first filter 18, a second filter 20, a first amplifier 22, a second amplifier 24, a first A/D converter 26 and a second A/D converter 28. This system converts a high frequency analog input signal $A \cdot \sin((\omega_o + \omega_s)t + \phi)$ received at terminal 30 into baseband signals $A \cdot M \cdot \sin(\omega_s t + \phi)$ on line 32 to provide the I component, and $A \cdot N \cdot \cos(\omega_s t + \phi)$ on line 34 to provide the Q component.

$\omega_s$ is the baseband frequency.
$\omega_o$ is the IF center frequency.
$\phi$ is phase of the input signal.
M is the gain of the I channel 10, 18, 22.
N is the gain of the Q channel 12, 20, 24.

The I and Q components on lines 32 and 34 are repeatedly sampled by the respective A/D converters 26 and 28 simultaneously in response to a clock signal on line 36 to provide an I digital signal at output terminal 38 and a Q digital signal at output terminal 40. The obtained binary values for the I and Q digital signals represent the baseband signal vector at the instant of sampling, and repeated sampling by A/D conversion provides an accurate representation of the baseband components on lines 32 and 24, including the information contained in the modulation of the input signal. There is no restriction on the kind of modulation, such as AM, FM, PM, BPSK, QPSK, etc.

The accuracy of this conversion is limited in practical applications due to unavoidable I/Q gain imbalance (i.e. N/M not being equal to 1 and phase errors ($e_\phi$) due to the I and Q signals not being offset by exactly ninety degrees from each other. These errors cause generation of a baseband image signal at $-\omega_s$ (where $\omega_s$ is the baseband signal frequency). Although the image signal is at a lower level than the baseband signals, the level is too high for many applications. For the image signal produced in the prior art system of FIG. 1, the image rejection (IR) with respect to the baseband signal is:

$$IR = 10 \log \frac{1 + \left(\frac{N}{M}\right)^2 + 2 \cdot \frac{N}{M} \cdot \cos\Phi}{1 + \left(\frac{N}{M}\right)^2 - 2 \cdot \frac{N}{M} \cdot \cos\Phi} \text{ [dB]} \quad \{\text{Eq. 1}\}$$

For typical achievable imbalances of $$20 \log \frac{N}{M} = 1\text{dB},$$

and a phase error of $e_\phi = 3$ degrees, the image rejection is 24 dB.

Another prior art method of converting an analog input signal for digital processing is to bandpass sample the analog input signal $A \cdot \sin((\omega_o + \omega_s)t + \phi)$ at a sampling rate of $f = 1/\tau$ to provide a sequence of digital signal samples:

$S_0 = A \cdot \sin \phi$, $S_1 = A \cdot \cos(\omega_s \tau + \phi)$, $S_2 = -A \cdot \sin(\omega_s 2\tau + \phi)$, $S_3 = -A \cdot \cos(\omega_s 3\tau + \phi)$, $S_4 = A \cdot \sin(\omega_s 4\tau + \phi)$, $S_5 = A \cdot \cos(\omega_s 5\tau + \phi)$, $S_6 = -A \cdot \sin(\omega_s 6\tau + \phi), \ldots$;

wherein $\omega_s$ is the baseband frequency, $\omega_o$ is the IF center frequency, and $\phi$ is the phase of the input signal. These digital signal samples are processed to provide a sequence of in-phase digital signals, $I_1$, $I_2$, $I_3$ and a sequence of quadrature-phase digital signals, $Q_1$, $Q_2$, $Q_3$.

Advantages of the bandpass sampling technique are that only one A/D converter is required and that there is no balance or tracking requirements for the different parts of the circuitry.

The choices of the sampling frequencies f are: $f = 4 f_o/(4m + 2a - 1)$, wherein m is 0, 1, 2, . . . ; and a is either 0 or 1. This provides samples that are 90 degrees apart for the IF center frequency $\omega_o$. However, frequencies that are offset from the IF center frequency have a phase error $e_\phi$) equal to $\omega_s \tau$. With $\omega_s \tau$ = the baseband frequency = the offset frequency, the rejection is a function of the baseband frequency $\omega_s$, and thereby becomes:

$$IR = 10 \log \frac{2(1 + \cos\omega_s\tau)}{2(1 - \cos\omega_s\tau)} = -20 \log \tan\left(\frac{\omega_s\tau}{2}\right)[\text{dB}] \quad \{\text{Eq. 2}\}$$

Although this is equivalent to the I/Q split model of FIG. 1, with no gain imbalance, (i.e. N/M = 1) and the phase error, $e_\phi = \omega\tau$, this prior art bandpass sampling technique provides a significant improvement over the prior art system of FIG. 1 by almost doubling the dB value of the image rejection.

For an UHF receiver with 25 KHz wide channels, the maximum baseband frequency is 12.5 KHz. When sampled at f = 4 MHz, the image rejection is 40 dB.

For some demanding applications, however, the image rejection must be much greater.

SUMMARY OF THE INVENTION

The present invention provides an system utilizing bandpass sampling for converting an analog signal into (I) in-phase and a (Q) quadrature-phase digital signals for digital signal processing, in which image rejection is improved.

In the system of the present invention, a sequence of digital signal samples obtained by bandpass sampling is processed to derive either the I digital signal or the Q digital signal as a first digital output signal from a first series of alternate samples and to derive the other of the I and Q digital signals as a second digital output signal by computing the average of the absolute values of alternate samples that immediately precede and follow the samples of the first series, with the sign depending on the sampling mode (i.e. whether a=0 or a=1).

Accordingly, in one embodiment the derived sequence of in-phase digital signals, $I_1$, $I_2$, $I_3$, is $$I_1 = S_1, I_2 = -S_3, \text{ and } I_3 = S_5;$$

and the derived sequence of quadrature-phase digital signals, $Q_1$, $Q_2$, $Q_3$, is $$Q_1 = \frac{-(2a - 1)(S_0 - S_2)}{2},$$

$$Q_2 = \frac{(2a - 1)(S_4 - S_2)}{2},$$

and $$Q_3 = \frac{-(2a - 1)(S_4 - S_6)}{2}.$$

In an alternative embodiment the derived sequence of in-phase digital signals, $I_1$, $I_2$, $I_3$, is $$I_1 = \frac{(2a - 1)(S_0 - S_2)}{2},$$

$$I_2 = \frac{-(2a - 1)(S_4 - S_2)}{2},$$

and $$I_3 = \frac{(2a - 1)(S_4 - S_6)}{2};$$

and the derived sequence of quadrature-phase digital signals, $Q_1$, $Q_2$, $Q_3$, is $$Q_1 = S_1, Q_2 = -S_3, \text{ and } Q_3 = S_5.$$

By processing the samples in accordance with the present invention, there is no phase error, but instead an amplitude error in each I/Q pair equal to the value of $\cos \omega_s \tau$. The resulting image rejection is In accordance with this processing scheme, image rejection becomes:

$$IR = 10 \log \frac{(1 + \cos\omega_s\tau)^2}{(1 - \cos\omega_s\tau)^2} = \quad \{Eq. 3\}$$

$$20 \log \frac{(1 + \cos\omega_s\tau)}{(1 - \cos\omega_s\tau)} = -40 \log \tan\left(\frac{\omega_s\tau}{2}\right)[dB]$$

Although this is equivalent to the I/Q split in the prior art system of FIG. 1 with $\Phi=0$ and $N/M=\cos(\omega_s\tau)$, the present invention provides a dramatic improvement over the prior art systems.

For an UHF receiver with 25 KHz wide channels, the maximum baseband frequency is 12.5 KHz. When sampled at $f=4$ MHz, the image rejection is 80 dB.

DESCRIPTION OF THE PREFERRED EMBODIMENT

Figure 1:
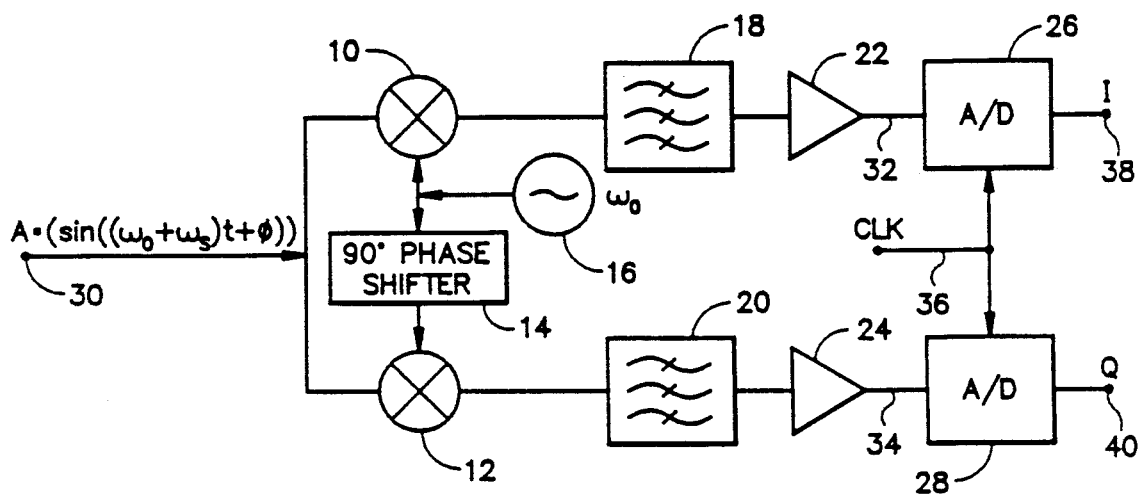
FIG. 1 is a diagram of a prior art system for converting an analog signal into (I) in-phase and a (Q) quadrature-phase digital signals.
Figure 2:
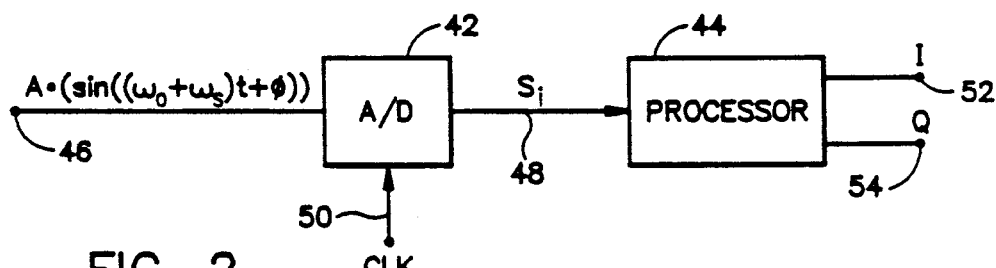
FIG. 2 is a diagram of a system according to both the prior art and the present invention that uses bandpass sampling for converting an analog signal into (I) in-phase and a (Q) quadrature-phase digital signals.

Referring to FIG. 2, the system of the present invention includes a D/A converter 42 and a digital signal processor 44.

The D/A converter converts a high frequency analog input signal $A \cdot \sin((\omega_o + \omega_s)t + \phi))$ received at terminal 46 into a sequence of digital signal samples $S_i$ on line 48 at a sampling rate of $f = 1/\tau$, as determined by the clock signal provided on line 50.

The sequence of digital signal samples $S_i$ obtained by this sampling process is:

$$S_0 = A \cdot \sin \phi,$$

$$S_1 = A \cdot \cos (\omega_s \tau + \phi),$$

$$S_2 = -A \cdot \sin (\omega_s 2\tau + \phi),$$

$$S_3 = -A \cdot \cos (\omega_s 3\tau + \phi),$$

$$S_4 = A \cdot \sin (\omega_s 4\tau + \phi),$$

$$S_5 = A \cdot \cos (\omega_s 5\tau + \phi),$$

$$S_6 = -A \cdot \sin (\omega_s 6\tau + \phi), \ldots;$$

The processor 44 processes the sequence $S_i$ of digital signal samples on line 48 to provide a sequence of in-phase digital signals $I_1$, $I_2$, $I_3$ at output terminal 52, and a sequence of quadrature-phase digital signals $Q_1$, $Q_2$, $Q_3$ at output terminal 54.

In this preferred embodiment of the present invention, the processor 44 processes the digital signal samples $S_i$ on line 48 to provide the following sequences of the in-phase digital signals, $I_1$, $I_2$, $I_3$ and the quadrature-phase digital signals $Q_1$, $Q_2$, $Q_3$:

$$I_1 = S_1, I_2 = -S_3, \text{ and } I_3 = S_5;$$

and $$Q_1 = \frac{-(2a - 1)(S_0 - S_2)}{2},$$

$$Q_2 = \frac{(2a - 1)(S_4 - S_2)}{2},$$

and $$Q_3 = \frac{-(2a - 1)(S_4 - S_6)}{2}.$$

Figure 3:
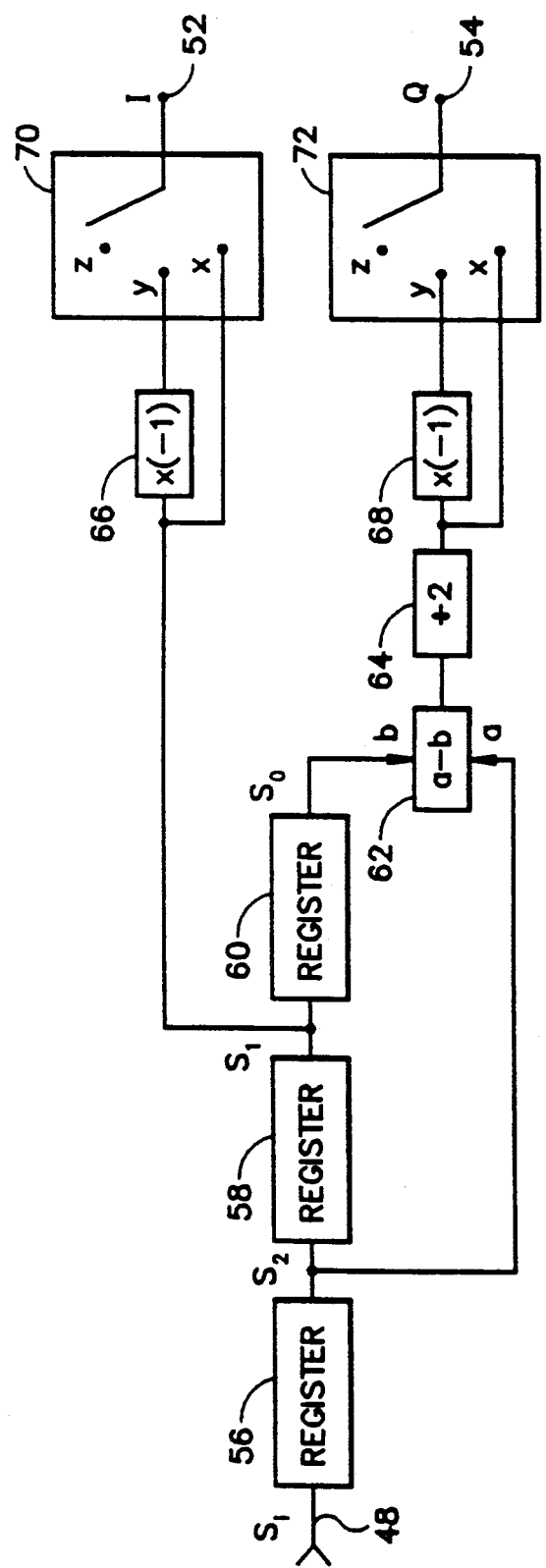
FIG. 3 is a diagram illustrating a system according to a preferred embodiment of the present invention for processing digital signal samples obtained by bandpass sampling.

A system by which the processor 44 implements the foregoing processing scheme is illustrated in FIG. 3. This system includes a first register 56, a second register 58, a third register 60, a subtraction unit 62, a divide-by-two unit 64, a first sign-reversal unit 66, a second sign reversal unit 68, an I-channel switch 70 and a Q-channel switch 72.

The three registers 56, 58 and 60 are connected in series with each other such that when digital signal sample $S_0$ is provided from the output of the third register 60, digital signal sample $S_1$ is provided from the output of the second register 58, and digital signal sample $S_2$ is provided from the output of the first register 56, and so forth as the digital signal samples are sequentially taken and processed. The substraction unit 62 subtracts the value "b" of the output provided by the third register 60 from the value "a" of the output provided by the first register 56 to provide a difference value that is divided in half by the divide-by-two unit 64. The output of the second register 58 is also provided to both the first sign-reversal unit 66 and the "z" terminal of the I-channel switch 70. The output of the first sign-reversal unit 66 is provided to the "x" terminal of the I-channel switch 70. The output of the divide-by-two unit 64 is provided to both the second sign-reversal unit 68 and the "z" terminal of the Q-channel switch 72. The output of the second sign-reversal unit 68 is provided to the "x" terminal of the Q-channel switch 72. The I-channel switch 70 and the Q-channel switch 72 are both operated in response to the same clock signal as that which clocks the A/D converter 42. The I-channel switch 70 and the Q-channel switch 72 are both operated to connect their respective output terminals 52, 54 to one of their respective switch terminals x, y and z in a sequence of x-y-z-y-x, and so forth.

I claim:

1. A system for converting an analog signal into (I) in-phase and a (Q) quadrature-phase digital signals, comprising means for converting an analog input signal $A \cdot \sin((\omega_o + \omega_s)t + \phi))$ at a sampling rate of $f = 1/\tau = 4 f_o/(4m + 2a - 1)$, wherein m is 0, 1, 2, . . . ; and a is either 0 or 1, to provide a sequence of digital signal samples:

$S_0 = A \cdot \sin \phi$, $S_1 = A \cdot \cos (\omega_s \tau + \phi)$, $S_2 = -A \cdot \sin (\omega_s 2\tau + \phi)$, $S_3 = -A \cdot \cos (\omega_s 3\tau + \phi)$, $S_4 = A \cdot \sin (\omega_s 4\tau + \phi)$, $S_5 = A \cdot \cos (\omega_s 5\tau + \phi)$, $S_6 = -A \cdot \sin (\omega_s 6\tau + \phi), \ldots;$ wherein $\omega_s$ is the baseband frequency, $\omega_o$ is the IF center frequency, and $\phi$ is the phase of the analog input signal; and means for processing said sequence of digital signal samples to derive either an I digital signal or a Q digital signal as a first digital output signal from a first series of alternate samples and to derive the other of the I and Q digital signals as a second digital output signal by computing the average of the absolute values of alternate samples that immediately precede and follow the samples of the first series, with the sign depending on the sampling mode (i.e. whether $a=0$ or $a=1$).

2. A system according to claim 1, wherein the processing means are adapted for processing said digital signal samples to provide a sequence of in-phase digital signals, $I_1 = S_1$, $I_2 = -S_3$, and $I_3 = S_5$;

and a sequence of quadrature-phase digital signals, $$Q_1 = \frac{-(2a - 1)(S_0 - S_2)}{2},$$

$$Q_2 = \frac{(2a - 1)(S_4 - S_2)}{2},$$

and $$Q_3 = \frac{-(2a - 1)(S_4 - S_6)}{2}.$$

3. A system according to claim 1, wherein the processing means are adapted for processing said digital signal samples to provide a sequence of in-phase digital signals, $$I_1 = \frac{(2a - 1)(S_0 - S_2)}{2},$$

$$I_2 = \frac{-(2a - 1)(S_4 - S_2)}{2},$$

and $$I_3 = \frac{(2a - 1)(S_4 - S_6)}{2};$$

and a sequence of quadrature-phase digital signals, $Q_1$, $Q_2$, $Q_3$, is $Q_1 = S_1$, $Q_2 = -S_3$, and $Q_3 = S_5$.

* * * * *